(12) United States Patent
Glos et al.

(10) Patent No.: US 8,735,458 B2
(45) Date of Patent: May 27, 2014

(54) AQUEOUS COLD-CURE FLEXIBLE STABILIZER FORMULATIONS

(71) Applicant: Evonik Goldschmidt GmbH, Essen (DE)

(72) Inventors: Martin Glos, Borken (DE); William Bunting, Chester, VA (US); Harald Modro, Gladbeck (DE); Mladen Vidakovic, Duisburg (DE)

(73) Assignee: Evonik Goldschmidt GmbH, Essen (DE)

( * ) Notice: Subject to any disclaimer, the term of this patent is extended or adjusted under 35 U.S.C. 154(b) by 54 days.

(21) Appl. No.: 13/669,037

(22) Filed: Nov. 5, 2012

(65) Prior Publication Data

US 2013/0072585 A1 Mar. 21, 2013

Related U.S. Application Data

(62) Division of application No. 11/639,615, filed on Dec. 15, 2006, now Pat. No. 8,303,843.

(51) Int. Cl.
    *C08G 77/46* (2006.01)

(52) U.S. Cl.
    USPC ........... 521/112; 521/110; 521/111; 521/122; 521/130; 521/154; 521/170; 521/174

(58) Field of Classification Search
    USPC ......... 521/110, 111, 112, 122, 130, 154, 170, 521/174
    See application file for complete search history.

(56) References Cited

U.S. PATENT DOCUMENTS

| | | | |
|---|---|---|---|
| 3,193,517 A | 7/1965 | Gindler et al. | |
| 3,341,338 A | 9/1967 | Pater et al. | |
| 4,347,330 A | 8/1982 | Demou et al. | |
| 4,350,777 A | 9/1982 | Henrichs et al. | |
| 4,477,601 A * | 10/1984 | Battice | 521/111 |
| 4,565,647 A | 1/1986 | Lienado | |
| 4,751,251 A | 6/1988 | Thornsberry | |
| 4,769,174 A | 9/1988 | Kilgour | |
| 5,064,870 A | 11/1991 | Kollmeier et al. | |
| 5,177,116 A * | 1/1993 | Genz et al. | 521/110 |
| 5,192,812 A | 3/1993 | Farris et al. | |
| 5,240,982 A | 8/1993 | Farwaha et al. | |
| 6,245,824 B1 * | 6/2001 | Frey et al. | 521/112 |
| 6,391,831 B1 | 5/2002 | Ebbrecht et al. | |
| 7,018,458 B2 | 3/2006 | Knott et al. | |
| 8,324,289 B2 * | 12/2012 | Sasaki et al. | 521/110 |
| 2006/0128816 A1 | 6/2006 | Cheng et al. | |

FOREIGN PATENT DOCUMENTS

| | | |
|---|---|---|
| DE | 1029648 | 5/1958 |
| DE | 2356443 | 5/1974 |
| DE | 2533074 | 3/1976 |
| DE | 3024870 | 1/1982 |
| DE | 3626297 | 7/1987 |
| DE | 19940797 | 3/2001 |
| EP | 1095968 | 5/2001 |
| WO | WO 2006057255 A1 * | 6/2006 |

OTHER PUBLICATIONS

Heusch, R., "Emulsions", Ullmann's Encyclopedia of Industrial Chemistry, Fifth, Completely Revised Edition, pp. 297-338, vol. A 9, VCH, Germany.

Kosswig, K., "Surfactants", Ullmann's Encyclopedia of Industrial Chemistry, Fifth, Completely Revised Edition, pp. 747-817, vol. A 25, VCH, Germany.

* cited by examiner

*Primary Examiner* — John Cooney
(74) *Attorney, Agent, or Firm* — Scully, Scott, Murphy & Presser, P.C.

(57) ABSTRACT

Aqueous cold-cure flexible foam stabilizer including the following components:
a) from ≥0.1 to ≤80% by weight of at least one water-insoluble polysiloxane compound having a molecular weight of from ≥300 g/mol to ≤10 000 g/mol,
b) ≥2% by weight of water,
c) ≥0.1% by weight of surfactant,
d) from ≥0 to 10% by weight of additives selected from the group consisting of thickeners, antifreezes, organic solvents and biocides,
e) ≥0% by weight of water-soluble siloxane(s),
with the proportion by weight of the abovementioned components being selected so that the sum of the proportions by weight of the components is not more than 100% by weight, based on the aqueous cold-cure flexible foam stabilizer formulation.

12 Claims, No Drawings

AQUEOUS COLD-CURE FLEXIBLE STABILIZER FORMULATIONS

CROSS REFERENCE TO RELATED APPLICATION

This application is a divisional of U.S. patent application Ser. No. 11/639,615, filed Dec. 15, 2006 the entire content and disclosure of which is incorporated herein by reference.

FIELD OF THE INVENTION

The present invention relates to aqueous cold-cure flexible foam stabilizer formulations for use in the production of highly elastic cold-cure flexible polyurethane foams or for the use in the production of cold-cure flexible foam activator blends for highly elastic cold-cure polyurethane foams and their use. The present invention further provides cold-cure flexible foam activator blends based on the aqueous cold-cure flexible foam stabilizer formulations and also highly elastic cold-cure polyurethane foams obtainable using the aqueous cold-cure flexible foam stabilizer formulations and/or cold-cure flexible foam activator blends.

BACKGROUND OF THE INVENTION

Cold-cure flexible polyurethane foams are also referred to as "cold-cure foams" or "high-resilience foams (HR foams)".

Highly elastic cold-cure polyurethane foams are widely used for producing mattresses, upholstered furniture or automobile seats. Such polyurethane foams are produced by reacting isocyanates with polyols. In the production of cold-cure flexible polyurethane foams, foam stabilizers serve to stabilize the expanding foam. The stabilizers ensure that a regular cell structure is formed and no defects occur in the region below the skin (i.e., sub-surface voids).

To produce cold-cure flexible polyurethane foams, polyethers, crosslinkers, polyisocyanates and also customarily auxiliaries, such as catalysts, stabilizers, blowing agents and the like are typically employed. In all prior art processes, the system has a high intrinsic stability due to premature crosslinking of the polyurethane foam. For this reason, it is possible or necessary in many cases to dispense with the use of a polysiloxane-polyether copolymer as an additive that stabilizes the foam against settling, since these foam stabilizers, which are indispensable in the production of "hot-cure foams", lead to an unacceptable shrinkage tendency in the case of "cold-cure foams".

There are many processes for producing highly elastic flexible polyurethane foams that have been comprehensively described in the literature. DE-A-25 33 074, which is fully incorporated by reference, cites many literature references that describe the industrial production of flexible polyurethane foams.

Furthermore, the production of flexible polyurethane foams is described in Becker/Braun, Kunststoff-Handbuch, Volume 7 (editor: G. Oertel), Polyurethane, Carl Hanser Verlag, Munich; Vienna; 2nd edition 1983, which is fully incorporated by reference.

Stabilizers such as siloxanes are usually not used as pure substances, but as a component of an appropriate formulation in order to improve the meterability or the ability to be incorporated into the reaction matrix. To dissolve the siloxanes, various organic substances are used as "solvents" for such formulations. DE-A-2 356 443 describes many organic solvents for the production of formulations comprising aralkyl-modified siloxane oils.

However, organic solvents are associated with a series of disadvantages such as a problematical toxicological classification, an excessively high flammability of the formulation and/or an undesirable emission of organic solvent residues from the resulting foam. Furthermore, the organic solvents can have an adverse effect on the properties of the cold-cure flexible polyurethane foam, e.g., pore structure, elasticity and the like.

The use of water has an advantage over organic solvents because water is available in virtually unlimited quantities, is nontoxic and is not flammable. Furthermore, water can easily be purified and disposed of without technical complications. A further advantage is that the storage of water is not subject to any significant safety regulations. Overall, the use of water as a solvent enables the complication and therefore the costs, of producing the cold-cure flexible foam stabilizer formulations to be significantly reduced compared to nonaqueous systems.

In view of the above, there is a need for providing cold-cure flexible foam stabilizer formulations that include water as a solvent.

SUMMARY OF THE INVENTION

The present invention provides cold-cure flexible foam stabilizer formulations comprising water-insoluble polysiloxane compounds and also cold-cure flexible foam activator blends that avoid at least one of the above disadvantages.

In particular, the present invention provides an aqueous cold-cure flexible foam stabilizer formulation for use in the production of highly elastic cold-cure flexible polyurethane foams or for use in the production of cold-cure flexible foam activator blends for highly elastic cold-cure polyurethane foams, wherein the aqueous cold-cure flexible foam stabilizer formulation comprises the following components:

a) from $\geq 0.1$ to $\leq 80\%$ by weight of at least one water-insoluble polysiloxane compound having a molecular weight of from $\geq 300$ g/mol to $\leq 10\,000$ g/mol,
b) 2% by weight of water,
c) 0.1% by weight of a surfactant,
d) from $\geq 0$ to 10% by weight of an additive selected from the group consisting of thickeners, antifreezes, organic solvents and biocides, and
e) 0% by weight of water-soluble siloxane(s), with the proportion by weight of the above-mentioned components is selected so that the sum of the proportions by weight of the components is not more than 100% by weight, based on the aqueous cold-cure flexible foam stabilizer formulation.

DETAILED DESCRIPTION OF THE INVENTION

The present invention, which provides an aqueous cold-cure flexible foam stabilizer formulation for the production of highly elastic cold-cure flexible polyurethane foams or of cold-cure flexible foam activators, will now be described in greater detail by referring to the following discussion.

The cold-cure flexible foam stabilizer formulation of the invention can contain from $\geq 0.2$ to $\leq 70\%$ by weight, preferably from $\geq 0.5$ to $\leq 60\%$ by weight, more preferably from $\geq 1$ to $\leq 50\%$ by weight, even more preferably from $\geq 2$ to $\leq 40\%$ by weight and exceptionally preferably from $\geq 3$ to $\leq 30\%$ by weight, of at least one water-insoluble polysiloxane compound.

The cold-cure flexible foam stabilizer formulation of the invention can contain from $\geq 5$ to $\leq 99\%$ by weight, preferably $\geq 10$ to $\leq 97\%$ by weight, more preferably from $\geq 15$ to $\leq 95\%$ by weight, even more preferably from ≥20 to ≤92% by weight and exceptionally preferably from ≥40 to ≤90% by weight, of water.

The cold-cure flexible foam stabilizer formulation of the invention can contain from ≥0.1 to ≤99% by weight, preferably from ≥0.2 to ≤90% by weight, more preferably from ≥0.3 to ≤40% by weight, even more preferably from ≥0.8 to ≤15% by weight and exceptionally preferably from ≥1 to ≤10% by weight, of surfactant. The surfactant can, in particular, be water-soluble.

The cold-cure flexible foam stabilizer formulation of the invention can contain from ≥0.5 to ≤9% by weight, preferably from ≥1 to ≤8% by weight, more preferably from ≥2 to ≤7% by weight, even more preferably from ≥3 to ≤6% by weight and exceptionally preferably from ≥4 to ≤5% by weight, of at least one additive selected from the group consisting of thickeners, antifreezes, organic solvents and biocides.

The cold-cure flexible foam stabilizer formulation of the invention can contain from ≥0.2 to ≤70% by weight, preferably ≥0.5 to ≤60% by weight, more preferably from ≥1 to ≤50% by weight, even more preferably from ≥2 to ≤40% by weight and exceptionally preferably from ≥3 to ≤30% by weight, of water-soluble siloxane(s), with the water-soluble siloxane(s) preferably being present in up to twice the proportion by weight, based on the water-insoluble polysiloxane compound, in the aqueous cold-cure flexible foam stabilizer formulation.

The proportion by weight of the above-mentioned components is, unless expressly stated otherwise, selected so that the sum of the proportion by weight of components is not more than 100% by weight, based on the aqueous cold-cure flexible foam stabilizer formulation.

Unless stated otherwise, the respective components can be present individually or as a mixture. It is even preferred that the polysiloxane compounds are present as a mixture.

The compounds which can be used according to the invention, encompassing water-insoluble polysiloxane compounds, surfactants, additives, water-soluble siloxanes and, if appropriate, further additives are in each case different from one another and are mutually exclusive. Thus, for example, the surfactant does not encompass water-insoluble polysiloxane compounds or water-soluble siloxane and vice versa. Furthermore, for example, the additives do not encompass surfactants, water-insoluble polysiloxane compounds or water-soluble siloxane and vice versa.

The weight of the water-insoluble and water-soluble siloxanes in the cold-cure flexible foam stabilizer formulation can (in total) be from ≥0.2 to ≤70% by weight, preferably from ≥0.5 to ≤60% by weight, more preferably from ≥1 to ≤50% by weight, even more preferably from ≥2 to ≤40% by weight and exceptionally preferably from ≥3 to ≤30% by weight, based on the total weight of the cold-cure flexible foam stabilizer formulation of the invention.

If the water content of the formulation is in the range from 60 to 98% by weight, the ratio of the proportion by mass of the water-soluble siloxanes to the proportion by mass of the water-insoluble siloxanes in the formulation can be in the range from 0 to 5. In most cases, the ratio can be ≤4, ≤2 or even ≤1.

The cold-cure flexible foam stabilizer solution of the invention can contain ≥1 water-soluble siloxanes, but can also be free of water-soluble siloxanes. If the cold-cure flexible foam stabilizer solution of the invention contains water-soluble siloxanes, it can be preferred that the water-soluble siloxane is present in the aqueous cold-cure flexible foam stabilizer formulation in a maximum amount of twice the proportion by weight of the water-insoluble polysiloxane compound.

Furthermore, it can be preferred according to the invention that the ratio (Q) of the proportion by mass of the surfactants used to the proportion by mass of the water-insoluble siloxanes in the cold-cure flexible foam stabilizer solution of the invention is in the range 0<Q≤1, in particular Q≤0.5, more preferably Q≤0.2 or even Q≤0.15.

Particular preference is given to the water content of the cold-cure flexible foam stabilizer solution of the invention being in the range from ≥60 to ≤98% by weight and/or the ratio of the proportion by mass of the surfactants used to the proportion by mass of the water-insoluble siloxanes in the formulation being in the range 0<Q≤1, in particular Q≤0.5, more preferably Q≤0.2 or even Q≤0.15.

It has been found that an excessively high surfactant content can be disadvantageous for the foaming process. For example, the foam structure can be disrupted. Furthermore, surfactants in the foam can lead to undesirable emissions or other secondary effects.

A further embodiment of the present invention is to provide a cold-cure flexible foam stabilizer solution which has a very high proportion of water and siloxane since these two components are required for foaming. The proportion of substances such as surfactants that is not necessary for foaming is therefore reduced as far as possible according to the invention.

A further preferred cold-cure flexible foam stabilizer solution according to the invention comprises the following components:

a) from 0.1 to 80% by weight of at least one water-insoluble polysiloxane compound having a molecular weight of ≤10 000 g/mol and the general formula I:

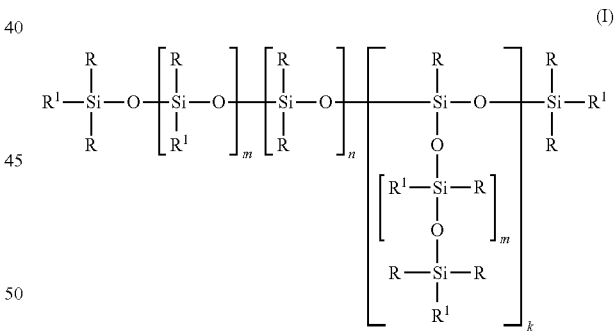

where the radicals
R are identical or different and are each a linear, branched, unsaturated or saturated hydrocarbon radical having from 1 to 50 carbon atoms, the radicals
$R^1$ are identical or different and are each R, OH or a linear, branched, unsaturated or saturated hydrocarbon radical having from 1 to 100 carbon atoms and containing at least one heteroatom selected from the group consisting of N, S, O, P, F, Cl, Br and/or I,
n is from ≥0 to 50,
m is from ≥0 to 50,
k is from ≥0 to 10,
b) from 2 to 99% by weight of water,
c) from 0.1 to 90% by weight of surfactant, d) from ≥0 to 10% by weight of additives selected from the group consisting of thickeners, antifreezes, organic solvents and biocides, e) from ≥0 to 80% by weight of water-soluble siloxane(s), with the proviso that n+m≥2 and n+m≤70 and with the proportion by weight of the above-mentioned components being selected so that the sum of the proportions by weight of the components, based on the total weight of the aqueous cold-cure flexible foam stabilizer formulation, is not more than 100% by weight.

Further preference is given to an aqueous cold-cure flexible foam stabilizer formulation comprising at least one water-insoluble polysiloxane compound of the general formula I in which the radicals R are identical or different and are each an alkyl or aryl radical, preferably methyl, ethyl or propyl and more preferably methyl, n is from 1 to 50, preferably from 3 to 40 and particularly preferably from 5 to 25, m is from ≥1 to 20, preferably from 2 to 15 and particularly preferably from 3 to 10, k is from ≥1 to 10, preferably from 2 to 8 and particularly preferably from 3 to 6.

Furthermore, preference is given an aqueous cold-cure flexible foam stabilizer formulation comprising at least one water-insoluble polysiloxane compound of the general formula I in which at least one $R^1$ is a side chain of the formula II:

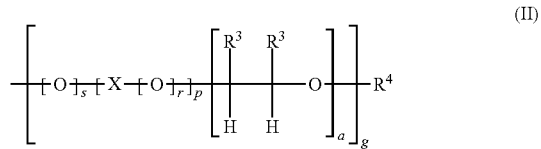

(II)

where the radicals $R^3$ are identical or different and are each H, methyl, ethyl, propyl or phenyl, the radicals $R^4$ are identical or different and are each H or an alkyl, acyl, acetyl, aryl radical, preferably a monovalent or divalent hydrocarbon radical having from 1 to 30 carbon atoms and more preferably a monovalent (g=1) or divalent (g=2) hydrocarbon radical having from 1 to 30 carbon atoms and at least one heteroatom selected from the group consisting of N, S, O, P, F, Cl, Br and/or I, where in the case of g=2 two compounds of the general formula (I) are linked by the radical of the formula (II), X is a saturated, unsaturated, branched, cyclic, bifunctional hydrocarbon which has from 1 to 30 carbon atoms and can also contain heteroatoms such as N or O, a is from ≥0 to ≤30, preferably from 1 to 25 and more preferably from 2 to 20, g is 1 or 2, P is 0 or 1, r is 0 or 1, s=0 or 1.

In a further preferred embodiment of the present invention, the water-insoluble polysiloxane compound that can be used according to the invention has the formula III:

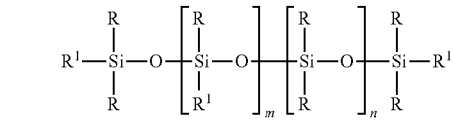

(III)

where the radicals

R are identical or different and are each methyl or ethyl, the radicals $R^1$ are identical or different and are each R, OH or an alkyl radical containing hydroxy, amino, chloro or cyano groups, preferably hydroxyalkyl, aminoalkyl, chloropropyl or cyanopropyl, n is from ≥2 to 30, preferably from 3 to 25 and particularly preferably from 4 to 25, m is from ≥0 to ≤5.

It will be obvious to a person skilled in the art that the water-insoluble polysiloxane compounds that can be used according to the invention are present in the form of a mixture whose distribution is determined essentially by the laws of statistics. The various structural units in the above formulae I, II and III can be arranged randomly or blockwise. The values of a, g, n, m, k, p, r and/or s therefore correspond to means.

The water-insoluble polysiloxane compounds, which can be used according to the invention, are suitable for producing cold-cure flexible polyurethane foams.

In the production of flexible polyurethane foams, a distinction is made, according to the reactivity of the raw materials, between hot-cure flexible polyurethane foams, (hereinafter referred to as hot-cure foams) and cold-cure flexible polyurethane foams (hereinafter referred to as cold-cure foams). These terms are derived from foaming in molds. Thus, in the production of hot-cure foams in molds, it is necessary to heat the foam in the mold at elevated temperature, for example ≥90° C., to complete crosslinking because of the low reactivity of the raw materials; these foams are therefore referred to as hot-cure foams.

On the other hand, the development of highly reactive polyether polyols and, if appropriate, the additional use of crosslinkers has made it possible to produce the foam in the mold with little input of heat because of the rapid curing. Such foams are therefore referred to as cold-cure foams.

Apart from foaming in molds, it is also possible to carry out foaming by a slabstock process. The terms cold-cure foam and hot-cure foam are established in such a process as well.

Owing to the different raw materials, cold-cure foams have quite typical physical properties, which distinguish them from hot-cure foams.

The cold-cure foams have:

(a) a latex-like feel, (b) an increased elasticity compared to conventional hot-cure foams, which is why these foams are also referred to as "high-resilience foams" (HR foams), (c) compressive strength characteristics different from hot-cure foam (higher sag factor) and thus better seating comfort when used as upholstery material (furniture foam), (d) good long-term use properties with only a low fatigue tendency, which is of great interest in, particularly, the automobile sector, (e) owing to their melting behavior, a better flame resistance than conventional hot-cure foams, and (f) a more favorable energy balance and shorter cycle times in foaming in molds.

A further important feature of cold-cure foams is the "ball rebound". A method of determining the ball rebound is described, for example, in ISO 8307. Here, a steel ball having a fixed mass is dropped from a particular height onto the test specimen and the height of rebound is then measured in percent of the drop height. Typical values for a cold-cure flexible foam are in the range above 55%. In comparison, hot-cure foams or polyurethane ester foams, hereinafter also referred to as ester foams, have ball rebound values of only 30-48%.

To produce a cold-cure flexible polyurethane foam, a mixture of polyol, polyfunctional isocyanate, amine activator, tin, zinc or other suitable metal-containing catalysts, stabilizers, blowing agents, usually water to form $CO_2$ and, if appropriate, an addition of physical blowing agents, if appropriate with addition of further additives such as flame retardants, color pastes, fillers, crosslinkers or other customary processing aids, is reacted.

In the production of a cold-cure flexible foam, the critical difference from a hot-cure foam is that highly reactive polyols and, optionally, also low molecular weight crosslinkers, are used, with the function of the crosslinker also being able to be taken over by relatively high-functionality isocyanates. Thus, reaction of the isocyanate groups with the hydroxyl groups occurs even in the expansion phase ($CO_2$ formation from —NCO and $H_2O$) of the foam. This rapid polyurethane reaction leads, via the increase in viscosity, to a relatively high intrinsic stability of the foam during the blowing process.

Cold-cure flexible polyurethane foams are consequently highly elastic foams in which stabilization of the sub-surface zones (i.e., the regions below the surface of the foam) plays a large role. Because of the high intrinsic stability, the cells at the end of the foaming process are often not sufficiently opened and mechanical pressure has to be applied to open them. Here, the force required to open the cells serves as a measure of the proportion of open cells. Foams having a high proportion of open cells and requiring only low forces to open the cells are desirable. In the case of foaming in a mold, cold-cure flexible polyurethane foams are, in contrast to hot-cure flexible polyurethane foams, produced at a temperature of, for example, 90° C.

Flexible foams are classified not only into cold-cure flexible polyurethane foams and hot-cure flexible polyurethane foams, but also polyurethane ester foams.

Polyurethane ester foams are foams have a very regular cell structure. An irregular structure (known as a sponge structure) can be obtained by deliberate disruption of the foam. Polyurethane ester foams can be obtained by reacting diisocyanates with polyesters containing hydroxyl groups, for example, polyesters formed by reaction of dicarboxylic acids and polyhydroxyalcohols. Substances suitable for deliberate disruption of the foam are, for example, polydimethylsiloxane compounds having a molecular weight of 40 000. Such polysiloxane compounds, which can be used for disruption of the foam, frequently have a viscosity of at least 4000 mPas or above.

The water-insoluble polysiloxane compounds that can be used according to the invention are suitable neither for the production of hot-cure polyurethane foams, nor for the production of polyurethane ester foams. Both in hot-cure polyurethane foams and in ester foams, the water-insoluble polysiloxane compounds, which can be used according to the invention, would lead to a large disruption in the foam or even to complete collapse of the foam.

For the purposes of the present invention, the term "water-insoluble polysiloxane compounds" refers to polysiloxane compounds which can be stirred homogeneously in a maximum amount of 5 g into 100 ml of twice-distilled water at 23° C. in a 250 ml glass beaker by means of a Teflon-coated stirrer bar (3 cm length) at a stirrer speed of 200 rpm over a period of 1 hour without the mixture undergoing phase separation on standing for a period of at least 100 days.

For the purposes of the present invention, the term "water-soluble polysiloxane compounds" refers to polysiloxane compounds which can be stirred homogeneously in an amount of >5 g in 100 ml of twice-distilled water at 23° C. in a 250 ml glass beaker by means of a Teflon-coated stirrer bar (3 cm length) at a stirrer speed of 200 rpm over a period of 1 hour without the mixture undergoing phase separation on standing for a period of at least 100 days.

The cold-cure flexible foam stabilizer formulation of the invention can contain up to 10% by weight of organic solvent. The organic solvent can be selected from the group consisting of antifreezes, preferably short-chain alcohols and/or glycols, preferably ethylene glycol, propylene glycol, diethylene glycol, dipropylene glycol.

Particular preference is given to cold-cure flexible foam stabilizer formulations that do not contain any organic solvents.

The cold-cure flexible foam stabilizer formulation and/or cold-cure flexible foam activator blend which, according to the invention, contains water-insoluble polysiloxanes as stabilizers, has advantageous properties for controlling the cell size and cell size distribution and also regulating the sub-surface zones.

In foaming to produce cold-cure flexible polyurethane slabstock foams, the actual problem is, apart from foam stabilization and regulation of the cell size distribution, the necessity of opening the cells at the right point in time and to the correct extent. If cell opening occurs too early or too late, the foam can collapse or shrink. If a foam does not have a sufficient proportion of open cells, the opening of the cells by means of mechanical pressure can present problems.

There are additional requirements in the production of a cold-cure flexible polyurethane foam molding, since the expanding reaction mixture has to travel along relatively long flow paths in order to fill the entire volume of the mold. Here, disruption of entire bands of cells can easily occur at the walls of the mold or at inserts that have been introduced, so that voids are formed below the skin of the foam. A further critical zone is in the region of the vents. If excess blowing gas flows past the bands of cells at a velocity which is too high, this leads to partially collapsed zones.

The cold-cure flexible foam stabilizer formulation and/or cold-cure flexible foam activator blend of the invention advantageously have/has the following advantages:
  satisfactory stabilization of the foam,
  stabilization against the effects of shear forces,
  stabilization of the subsurface zone and the skin,
  control of the cell size and the cell size distribution and also avoidance of an increased proportion of closed cells.

According to the invention, preference is given to water-insoluble polysiloxanes that have a molecular weight of from 300 to 4000 g/mol, preferably from 350 to 3500 g/mol and more preferably from 400 to 3000 g/mol.

Furthermore, it has been found that the formation of a regular pore structure, a good surface zone stability and low forces required for opening the cells of cold-cure flexible polyurethane foams can be obtained when the molar mass of the polyether units is not too high.

Furthermore, the solubility of polysiloxane compounds in water increases with increasing molar mass of the polyether units and can lead to impairment of the above-mentioned product properties. It is therefore preferred that the polyether units of the water-insoluble polysiloxane compound used according to the invention have a molar mass of from 44 to 1000 g/mol, preferably from 58 to 750 g/mol, and more preferably from 88 to 500 g/mol.

Furthermore, the cold-cure flexible foam stabilizer formulation of the invention can, if appropriate, also comprise water-soluble siloxanes. Water-soluble siloxanes can, but do not necessarily have to, be present in the cold-cure flexible foam stabilizer formulation of the invention in order to obtain the desired effects in the foaming of cold-cure flexible foam.

Water-insoluble polysiloxane compounds which are preferably used according to the invention have a maximum of 70 Si atoms, preferably a maximum of 50 Si atoms, particularly preferably from 5 to 25 Si atoms, per polysiloxane molecule, with polydimethylsiloxanes having from 5 to 25 Si atoms in the molecule being most preferred.

The polydimethylsiloxanes, which are suitable for the purposes of the invention have a low viscosity. It has been found that polydimethylsiloxanes having a viscosity of >200 mPas have an adverse effect on the formation of a very regular cell structure. In particular, viscosities of >500 mPas lead to an undesirably irregular sponge-like cell structure or even to collapse of the foam. According to the present invention, preference is thus given to polydimethylsiloxanes of the general formula (III) in which all radicals R, $R^1$=methyl radicals and m=0 and which have a viscosity of from ≥0 to ≤100 mPas, preferably from ≥0.5 to ≤80 mPas, more preferably from ≥1 to ≤70 mPas and particularly preferably from ≥1.5 mPas to ≤50 mPas.

Unless stated otherwise in the description of the present invention, the viscosity was measured by the Höppler method using a falling sphere viscometer at 20° C. in accordance with DIN 53015.

The method is based on the measurement of the time required by a sphere to travel under the force of gravity over a distance defined by annular marks in a cylindrical tube which has an internal diameter of 15.94 mm and is inclined by 10° and is filled with the liquid to be measured. Here, spheres having a predetermined density and predetermined diameter dependent on the viscosity range to be measured are used.

A preferred embodiment of the present invention comprises an aqueous cold-cure flexible foam stabilizer formulation comprising:
a) from ≥0.1 to ≤80% by weight, preferably from ≥0.2 to ≤60% by weight and more preferably from 0.3 to ≤50% by weight, of water-insoluble polysiloxane, with a water-insoluble polysiloxane in an amount of from 0.5 to ≤40% by weight being particularly preferred,
b) from ≥5 to ≤99% by weight, preferably from ≥10 to ≤95% by weight and more preferably from ≥30 to ≤90% by weight, of water,
c) from ≥0.1 to ≤99% by weight, preferably from ≥0.2 to ≤90% by weight and more preferably from ≥0.3 to ≤40% by weight, of surfactant,
d) from ≥0 to 10% by weight and preferably from 0.1 to 5% by weight of additives, and
e) from ≥0 to ≤80% by weight, preferably from ≥0 to ≤60% by weight and more preferably from 0 to ≤50% by weight, of water-soluble siloxane(s), with the proportion by weight of the above-mentioned components being selected so that the sum of the proportions by weight of the components, based on the total weight of the aqueous cold-cure flexible foam stabilizer formulation, is not more than 100% by weight.

A further preferred embodiment of the present invention comprises an aqueous cold-cure flexible foam stabilizer formulation comprising:
a) from ≥0.5 to ≤35% by weight, preferably from ≥1 to ≤30% by weight and more preferably from 3 to ≤25% by weight, of water-insoluble polysiloxane,
b) from ≥5 to ≤99% by weight, preferably from ≥20 to ≤95% by weight and more preferably from ≥40 to ≤90% by weight, of water,
c) from ≥0.2 to ≤20% by weight, preferably from ≥0.3 to ≤15% by weight and more preferably from 0.5 to ≤10% by weight, of surfactant,
d) from ≥0 to 10% by weight and preferably from 0.1 to 5% by weight of additives,
e) from ≥0 to ≤30% by weight, preferably from ≥0 to ≤25% by weight and more preferably from 0 to ≤20% by weight, of water-soluble siloxane(s),
with the proportion by weight of the above-mentioned components being selected so that the sum of the proportion by weight of the components, based on the total weight of the aqueous cold-cure flexible foam stabilizer formulation, is not more than 100% by weight.

The cold-cure flexible foam stabilizer formulations of the invention contain surfactants. In the description that follows, the terms "emulsifiers" and "surfactants" are interchangeably used.

Surfactants, which are used in the aqueous cold-cure flexible foam stabilizer formulation, can be selected from the group consisting of anionic surfactants, cationic surfactants, nonionic surfactants and amphoteric surfactants. The surfactant is particularly preferably a water-soluble nonionic surfactant (herein after referred to as 'niosurfactant').

In the case of the cold-cure flexible foam stabilizer formulations according to the invention, it has been found that creaming of the formulation can be observed in cold-cure flexible foam stabilizer formulations which contain ionic surfactants and in particular anionic surfactants as emulsifiers. It has now been found that creaming of the cold-cure flexible foam stabilizer formulation of the invention can be prevented only when, or at least predominantly when, niosurfactants are added as emulsifiers to the cold-cure flexible foam stabilizer formulation. In particular, creaming of the cold-cure flexible foam stabilizer formulation of the invention can be prevented by addition of a surfactant mixture containing ≥90% by weight of niosurfactant and/or ≤10% by weight of anionic surfactant.

Particular preference is therefore given, according to the invention, to using cold-cure flexible foam stabilizer formulations which contain at least 90% by weight of niosurfactants and not more than 10% by weight of ionic surfactants such as anionic surfactants, cationic surfactants and/or betaines as emulsifiers.

According to the invention, it is also possible to use polymeric emulsifiers such as polyalkylpolyoxyalkyl polyacrylates, polyvinylpyrrolidones or polyvinyl acetates as surfactants.

An overview of the surfactants which can be used may be found in Ullmann's Encyclopedia of Industrial Chemistry, fifth, completely revised edition, volume A9, page 297 ff and volume A25, page 747 ff; Stache, Tensid-Taschenbuch, 2nd revised and expanded edition, 1981, which are hereby incorporated by reference as part of the disclosure of the present invention.

Suitable anionic surfactants which can be used as emulsifiers for the cold-cure flexible foam stabilizer formulation are, for example, selected from the group consisting of alkyl sulfates, fatty alcohol sulfates, secondary alkyl sulfates, paraffinsulfonates, alkyl ether sulfates, alkylpolyglycol ether sulfates, fatty alcohol ether sulfates, alkylbenzenesulfonates, alkylphenol ether sulfates, alkyl phosphates, monoesters, diesters, triesters of phosphoric acid, alkyl ether phosphates, ethoxylated fatty alcohol esters of phosphoric acid, phosphonic esters, sulfosuccinic diesters, sulfosuccinic monoesters, ethoxylated sulfosuccinic monoesters, sulfosuccinimides, α-olefinsulfonates, alkyl carboxylates, alkyl ether carboxylates, alkyl-polyglycol carboxylates, fatty acid isethionate, fatty acid methyltauride, fatty acid sarcoside, arylsulfonates, naphthalenesulfonates, alkyl glyceryl ether sulfonates, polyacrylates and/or α-sulfo-fatty acid esters.

Suitable cationic surfactants which can be used as emulsifiers for the cold-cure flexible foam stabilizer formulation encompass, for example, aliphatic, cycloaliphatic or aromatic primary, secondary and tertiary ammoniums salts or alkanolammonium salts, quaternary ammonium compounds, pyridinium salts, oxazolium salts, thiazolium salts, salts of amine oxides, sulfonium salts, quinolinium salts, isoquinolinium salts, tropylium salts. The quaternary ammonium surfactant is preferably a mono-$C_6$-$C_{16}$—, preferably —$C_6$-$C_{10}$—N-alkylammonium or -alkenylammonium surfactant in which the remaining positions on the N atom are substituted by methyl, hydroxyethyl or hydroxypropyl groups or polyether groups (based on ethylene oxide and/or propylene oxide). The cationic surfactant is particularly preferably selected from the group consisting of ester quats, preferably di(tallow fatty acid amidoethyl)methylpolyethoxyammonium methosulfate, diamidoamine quats, alkyloxyalkyl quats, preferably cocopentaethoxymethylammonium methosulfate, and/or trialkyl quats, preferably cetyltrimethylammonium chloride.

Suitable amphoteric surfactants which can be employed in the present invention include, for example, amine oxides, aminocarboxylic acids, imidazoline carboxylates and betaines.

Suitable amine oxides include, but are not limited to all compounds having the formula $R^3(OR^4)_xNO(R^5)_2$, where $R^3$ is selected from among alkyl, hydroxyalkyl, acyl-amidopropyl and alkylphenyl groups and mixtures thereof having from 8 to 26 carbon atoms; $R^4$ is an alkylene or hydroxyalkylene group having from 2 to 3 carbon atoms or a mixture thereof; x is from 0 to 5, preferably from 0 to 3, and each $R^5$ is an alkyl or hydroxyalkyl group having from 1 to 3 carbon atoms or a polyethylene oxide group having from 1 to 3 ethylene oxide units. Preference is given to $C_{10}$-$C_{18}$-alkyldimethylamine oxide and $C_{10}$-$C_{18}$-acylamidoalkyldimethylamine oxide.

Further suitable amphoteric surfactants can largely be described as derivatives of secondary and tertiary amines, derivatives of heterocyclic secondary and tertiary amines or derivatives of quaternary ammonium, quaternary phosphonium or tertiary sulfonium compounds. Betaine and sultaine surfactants are particularly preferred amphoteric surfactants.

Suitable betaines are compounds of the formula $R(R')_2N^+R^2COO$—, where R is a $C_6$-$C_{18}$-hydrocarbyl group, each R' is generally $C_1$-$C_3$-alkyl and $R^2$ is a $C_1$-$C_5$-hydrocarbyl group. Preferred betaines are $C_{12-18}$-dimethylammoniohexanoate and the $C_{10-18}$-acylamidopropane (or -ethane)dimethyl (or diethyl) betaines. Complex betaine surfactants are likewise suitable according to the invention.

The amphoteric surfactant is particularly preferably selected from the group consisting of amphoacetates, amphodiacetates, glycinates, amphopropionates, sultaines, amine oxides and betaines.

Suitable niosurfactants are essentially all alkoxylated nonionic surfactants. Ethoxylated and propoxylated nonionic surfactants are preferred.

Preferred alkoxylated surfactants can be selected from the classes of nonionic condensates of alkylphenols, nonionic ethoxylated alcohols, nonionic ethoxylated/propoxylated fatty alcohols, nonionic ethoxylate/propoxylate condensates with propylene glycol and nonionic ethoxylate condensation products with propylene oxide/ethylenediamine addition products.

The condensation products of aliphatic alcohols having from 1 to 25 mol of alkylene oxide, preferably ethylene oxide and/or propylene oxide, can likewise be used according to the invention. The alkyl chain of the aliphatic alcohol can be either straight or branched, primary or secondary and generally contains from 1 to 35 carbon atoms. Particular preference is given to condensation products of alcohols which have an alkyl group having from 6 to 22 carbon atoms and from 2 to 200 mol of ethylene oxide per mol of alcohol.

Polyhydroxy fatty acid amides which are suitable are those having the structural formula $R^2CONR^1Z$, where: $R^1$ is H, $C_1$-$C_4$-hydrocarbyl, 2-hydroxyethyl, 2-hydroxypropyl, ethoxy, propoxy or a mixture thereof, preferably $C_1$-$C_4$-alkyl, more preferably $C_1$- or $C_2$-alkyl, most preferably $C_1$-alkyl (i.e. methyl), and $R^2$ is $C_5$-$C_{31}$-hydrocarbyl, preferably a straight-chain $C_5$-$C_{19}$-alkyl or -alkenyl, more preferably a straight-chain $C_9$-$C_{17}$-alkyl or -alkenyl, most preferably a straight-chain $C_{11}$-$C_{17}$-alkyl or -alkenyl, or a mixture thereof and Z is a polyhydroxyhydrocarbyl having a linear hydrocarbyl chain in which at least 3 hydroxyl groups are bound directly to the chain or an alkoxylated (preferably ethoxylated or propoxylated) derivative thereof. Z is preferably derived from a reducing sugar by reductive amination; Z is more preferably a glycidyl.

Suitable fatty acid amide surfactants encompass those having the formula:
$R^6CON(R^7)_2$, where $R^6$ is an alkyl group having from 7 to 21, preferably from 9 to 17, carbon atoms and each $R^7$ is selected from the group consisting of hydrogen, $C_1$-$C_4$-alkyl, $C_1$-$C_4$-hydroxyalkyl and —$(C_2H_4O)_xH$, where x is in the range from 1 to 3.

Suitable alkyl polysaccharides for use in this respect are disclosed in U.S. Pat. No. 4,565,647 and have a hydrophobic group containing from 6 to 30 carbon atoms and a hydrophilic polysaccharide group, e.g., a polyglycoside group, containing from 1.3 to 10 saccharide units.

Preferred alkyl polyglycosides have the formula: $R^2O(C_nH_{2n}O)_t(glycosyl)_x$, where $R^2$ is selected from the group consisting of alkyl, alkylphenyl, hydroxyalkyl, hydroxyalkylphenyl and mixtures thereof in which the alkyl groups have from 10 to 18 carbon atoms; n is 2 or 3; t is from 0 to 10 and x is from 1.3 to 8. The glycosyl group is preferably derived from glucose.

The nonionic surfactant is preferably selected from the group consisting of alcohol ethoxylates, fatty alcohol polyglycol ethers, fatty acid ethoxylates, fatty acid polyglycol esters, glyceride monoalkoxylates, alkanolamides, fatty acid alkylolamides, ethoxylated alkanol-amides, fatty acid alkylolamido ethoxylates, imidazolines, ethylene oxide-propylene oxide block copolymers, alkylphenol ethoxylates, alkyl glucosides, ethoxylated sorbitan esters and/or amine alkoxylates.

Examples of particularly preferred nonionic surfactants are addition products of ethylene oxide, propylene oxide, styrene oxide, as described in DE-A-19 940 797 and DE-A-10 029 648, or butylene oxide onto compounds having an acidic hydrogen, e.g., fatty alcohols, alkylphenols or alcohols from the oxo process. The HLB of the surfactants should be selected so that it is in the range in which the formation of the O/W emulsion is promoted. Examples are addition products of from 2 to 200 mol of ethylene oxide and/or propylene oxide onto linear or branched fatty alcohols having from 1 to 35 carbon atoms, onto fatty acids having from 6 to 30 carbon atoms and onto alkylphenols having from 4 to 35 carbon atoms in the alkyl group; $C_6$-$C_{30}$-fatty acid monoesters and diesters of addition products of from 1 to 200 mol of ethylene oxide or propylene oxide onto glycerol; glycerol monoesters and diesters and sorbitan monoesters, diesters and triesters of saturated and unsaturated fatty acids having from 6 to 22 carbon atoms and their ethylene oxide or propylene oxide addition products, and also the corresponding polyglycerol-based compounds; alkyl monoglycosides and oligoglycosides having from 8 to 22 carbon atoms in the alkyl radical and their ethoxylated or propoxylated analogues; addition products of from 2 to 200 mol of ethylene oxide or propylene oxide onto castor oil and/or solidified castor oil; polyol and in particular polyglycerol esters such as polyglycerol polyricinoleate, polyglycerol 12-hydroxystearate or polyglycerol dimerate.

Mixtures of compounds from a plurality of these classes of substances; partial esters based on linear, branched, unsaturated or saturated $C_6$-$C_{22}$-fatty acids, ricinoleic acid or 12-hydroxystearic acid and glycerol, polyglycerol, pentaerythritol, dipentaerythritol, sugar alcohols (for example, sorbitol), alkyl glucosides (for example, methyl glucoside, butyl glucoside, lauryl glucoside) and polyglucosides (for example, cellulose); wool wax alcohols or appropriate derivatives, mixed esters of pentaerythritol, fatty acids, citric acid and fatty alcohol and/or mixed esters of fatty acids having from 6 to 22 carbon atoms, methylglucose and polyols, preferably glycerol or polyglycerol and polyalkylene glycols, are likewise suitable.

It is also possible to use amine alkoxylates such as, for example, coconut amine ethoxylates, stearylamine ethoxylates or behenylamine ethoxylates. The use of ester oils, acid amides and mineral oils as nonionic component of the formulation, e.g., isotridecyl isononanoate, PEG-4 diheptanoate, isostearyl neopentanoate, cetyl octanoate, cetyl palmitate, cetyl ricinoleate, cetyl myristate, cetyl acetate, octyl palmitate, PPG-3 myristyl ether, ethylhexyl stearate, isododecanol, oleic acid diethanolamide, coconut fatty acid diethanolamide, 1-hydroxyethyl-2-heptadecenylimidazoline, paraffin oil, kerosene, is likewise possible.

Preference is given to using, in particular, water-soluble siloxane-containing emulsifiers, for example water-soluble polyether siloxanes, water-soluble polysiloxane-polyalkylpolyether copolymers having molar masses of from 400 to 1000 g/mol, commercially available from Goldschmidt GmbH under the trade names Tegopren® 5878, Tegopren® 5840, Tegopren® 5847. These above-mentioned water-soluble siloxanes have no influence or virtually no influence on foaming in the case of cold-cure foam.

Further particularly preferred surfactants or emulsifiers which can be used for the purposes of the invention are emulsifiers based on styrene oxide, as described in DE-A-19 940 797 and DE-A-10 029 648, which are hereby fully incorporated by reference.

Antifreezes which can be used according to the invention are salts such as NaCl, $CaCl_2$, potassium acetate or potassium formate or short-chain alcohols or glycols, e.g., isopropanol, butyl diglycol, ethylene glycol, diethylene glycol, dipropylene glycol or propylene glycol, and also urea or glycerol.

As thickeners, it is possible to use the compounds known from the prior art, e.g., polyacrylate-based compounds, preferably carbomers, carbopols or cellulose ethers, preferably Tylose® grades obtainable from Shinetsu, polyurethane-based compounds, such as Viscoplus® grades obtainable from Goldschmidt GmbH.

As biocides, it is possible to use commercial products such as chlorophene, benzisothiazolinone, hexahydro-1,3,5-tris(hydroxyethyl)-s-triazine, chloromethylisothiazolinone, methylisothiazolinone or 1,6-dihydroxy-2,5-dioxohexane, as are known under the trade names BIT 10, Nipacide BCP, Acticide MBS, Nipacide BK, Nipacide CI, Nipacide FC.

The viscosity of the cold-cure flexible foam stabilizer formulation is in the range from 20 mPas to 10 000 mPas, measured by the Höppler method at 20° C.

The aqueous cold-cure flexible foam stabilizer formulation according to the present invention can also be referred to as an emulsion.

If the formulation is in the form of an emulsion, the size distribution of the oil droplets present is such that over 90% by volume of the oil droplets are smaller than 2 μm, preferably smaller than 1 μm, and even more preferably smaller than 0.5 μm. The size distribution is measured using a Beckman Coulter model "LS 230" particle size measuring instrument operating according to the principle of laser light scattering.

To produce the cold-cure flexible foam stabilizer formulation, it is possible to use the methods of producing emulsions which are known to those skilled in the art, e.g., paste processes, homogenization by means of a high-pressure homogenizer, stirring processes, etc, as also described in DE-A-30 24 870, which is hereby fully incorporated by reference.

The aqueous cold-cure flexible foam stabilizer formulation has a very good stability. Thus, the cold-cure flexible foam stabilizer formulation of the invention is storage-stable at room temperature and undergoes no phase separation over, for example, a period of at least 10 days, preferably at least 50 days and more preferably at least 100 days, and/or no macroscopic inhomogeneity of the aqueous cold-cure flexible foam stabilizer formulation is observed.

A particular advantage of the aqueous cold-cure flexible foam stabilizer formulation of the invention is that it can be incorporated into an activator blend to give a storage-stable, homogeneous activator blend. In contrast, homogeneous activator blends cannot be produced using known stabilizers based on water-insoluble siloxanes, e.g., Tegostab® B 4113 LF obtainable from Goldschmidt.

It is often the case that all constituents apart from the polyols and isocyanates are mixed to form the activator blend before foaming. This then comprises, inter alia, the stabilizers (siloxanes), the catalysts such as amines, metal catalysts and the blowing agent, for example water, and also any further additives such as flame retardants, colorants, biocides, etc, depending on the formulation of the foam.

As amine activators or catalysts, preference is given to using tertiary amines such as triethylenediamine (TEDA) which has a predominantly crosslinking action, i.e., catalyzes the reaction between isocyanate and polyol, or bis(2-dimethylaminoethyl)ether (BDE) which has a predominantly blowing action, i.e., catalyzes the reaction between isocyanate and water. Many formulations are based on catalysis by a combination of these two compounds. However, it is also possible to use other amines for the purposes of the invention. The amount of amine activators or catalysts used is preferably from 0.05 to 0.5 part per 100.0 parts of polyol.

It has surprisingly been found that a homogeneous activator blend can easily be produced without additional outlay by mixing the cold-cure flexible foam stabilizer formulation of the invention with a composition comprising:

catalysts, preferably amines, metal catalysts,
  blowing agents, preferably acetone, methylene chloride, additional water,
  if appropriate flame retardants, UV stabilizers, dyes, biocides, pigments, cell openers, crosslinkers, other foam-stabilizing substances and customary additives.

The homogeneous cold-cure flexible foam activator blend of the invention has good storage stability. A homogeneous cold-cure flexible foam activator blend according to the invention can be stored at room temperature for a period of at least 10 days, preferably 50 days, particularly preferably 100 days, and be stable, i.e., no phase separation occurs and/or no macroscopic inhomogeneity of the cold-cure flexible foam activator blend is observed.

Without being tied to a particular theory, it is postulated that the good stability of the cold-cure flexible foam activator blend is achieved as a result of the content of surfactants. The use of niosurfactants in particular, preferably at least 90% by weight, based on the total weight of surfactant, leads to formation of a homogeneous cold-cure flexible foam activator blend without creaming occurring at the surface of the cold-cure flexible foam activator blend.

A preferred homogeneous cold-cure flexible foam activator blend according to the invention which is suitable for use in the production of highly elastic cold-cure flexible polyurethane foams comprises an aqueous cold-cure flexible foam stabilizer formulation according to the invention and additives selected from the group consisting of:
catalysts, preferably amines, metal catalysts,
blowing agents, preferably acetone, methylene chloride,
additional water,
and if appropriate additives selected from the group consisting of flame retardants, UV stabilizers, dyes, biocides, pigments, cell openers, crosslinkers, other foam-stabilizing substances and customary processing aids.

A preferred embodiment of the invention provides a homogeneous cold-cure flexible foam activator blend for use in the production of highly elastic cold-cure flexible polyurethane foams, which comprises:
from ≥2 to ≤25% by weight, preferably from ≥3 to ≤20% by weight and more preferably from 5 to ≤15% by weight, of aqueous cold-cure flexible foam stabilizer formulation,
from ≥1 to ≤20% by weight, preferably from ≥2 to ≤15% by weight and more preferably from ≥5 to ≤10% by weight, of catalyst,
from ≥1 to ≤90% by weight, preferably from ≥10 to ≤80% by weight and more preferably from ≥30 to ≤70% by weight, of blowing agents,
from ≥1 to ≤90% by weight, preferably from ≥10 to ≤80% by weight and more preferably from ≥30 to ≤70% by weight, of additional water, and
from ≥0 to ≤70% by weight, preferably from ≥2 to ≤60% by weight and more preferably from ≥5 to ≤50% by weight of additives,
with the proportion by weight of the above-mentioned components being selected so that the sum of the proportions by weight of the components is 100% by weight, based on the aqueous cold-cure flexible foam activator blend.

The homogeneous cold-cure flexible foam activator blend preferably contains from ≥0.01 to ≤10% by weight, more preferably from ≥0.05 to ≤5% by weight and even more preferably from ≥0.1 to ≤1% by weight, of polysiloxane which can be used according to the invention, based on the total weight of the homogeneous cold-cure flexible foam activator blend.

As catalysts, it is possible to use the catalysts known in the prior art for activator blends. Suitable catalysts which can be used are customary metal catalysts such as tin and zinc compounds. Suitable catalysts also include amines.

The polyurethane reaction is generally catalyzed by the addition of tin activators. Use is made of dibutyltin dilaurate (DBTDL), tin(II) octoate, tin ricinoleate or suitable zinc compounds. The amounts used are usually from 0.01 to 0.5 part per 100.0 parts of polyol, but can also deviate from this.

In the case of the blowing agents, a distinction is made between chemical and physical blowing agents. Chemical blowing agents include water whose reaction with the isocyanate groups leads to formation of $CO_2$. The density of the foam can be controlled via the amount of water added, with preference being given to using from 1.5 to 5.0 parts of water per 100.0 parts of polyol. It is also possible to use, as an alternative and/or in addition, physical blowing agents such as carbon dioxide, acetone, hydrocarbons such as n-pentane, isopentane or cyclopentane, cyclohexane, halogenated hydrocarbons such as methylene chloride, tetrafluoroethane, pentafluoropropane, heptafluoropropane, pentafluorobutane, hexafluorobutane and/or dichloromonofluoroethane. The amount of physical blowing agent is preferably in the range from 1 to 15 parts by weight, in particular from 1 to 10 parts by weight, and the amount of water is preferably in the range from 0.5 to 10 parts by weight, in particular from 1 to 5 parts by weight. Among the physical blowing agents, preference is given to carbon dioxide, which is preferably used in combination with water, as a chemical blowing agent.

According to the invention, it can be preferred that the cold-cure flexible foam activator blend contains no further foam-stabilizing water-insoluble and/or water-soluble siloxanes apart from the water-insoluble polysiloxane compounds used according to the invention.

It can be particularly preferred that the cold-cure flexible foam activator blend contains no further molecules containing Si atoms apart from the water-insoluble polysiloxane compounds used according to the invention.

The cold-cure flexible foam activator blend can additionally contain all customary additives known in the prior art for activator blends. The additives can be selected from the group consisting of flame retardants, UV stabilizers, dyes, biocides, pigments, cell openers, crosslinkers and the like.

The aqueous cold-cure flexible foam stabilizer formulations and/or cold-cure flexible foam activator blends of the invention are used for producing highly elastic cold-cure flexible polyurethane foams. The aqueous cold-cure flexible foam stabilizer formulations and/or cold-cure flexible foam activator blends of the invention are suitable for the production of cold-cure polyurethane slabstock foam and also for the production of molded cold-cure polyurethane foam.

The aqueous cold-cure flexible foam stabilizer formulations and/or cold-cure flexible foam activator blends of the invention are unsuitable for the production of polyurethane ester foams and other polyurethane foams such as hot-cure flexible polyurethane foams.

To produce a cold-cure flexible polyurethane foam, a mixture of polyol, polyfunctional isocyanate, amine activator, tin or zinc or other metal-containing catalysts, stabilizer, blowing agents, preferably water for forming $CO_2$ and, if necessary, addition of physical blowing agents, if appropriate with addition of flame retardants, UV stabilizers, color pastes, biocides, fillers, crosslinkers or other customary processing aids, is reacted.

Polyols used are highly reactive polyols. Typically, trifunctional polyols are preferred which, not only have a high molecular weight of from about 4800 to 6500 g/mol, but also from at least 70 to 95% of primary hydroxyl groups, so that their OH number is in the range from 36 to 26 mg KOH/g. These polyols are made up to an extent of up to 90% of propylene oxide, but contain primary OH end groups resulting virtually exclusively from the addition reaction of ethylene oxide. The primary OH groups are far more reactive toward isocyanate groups than the secondary OH groups of the polyols used for producing hot-cure flexible polyurethane foam, which have OH numbers of usually from 56 to 42 mg KOH/g at molecular weights in the range from 3000 to 4500 g/mol.

The cold-cure polyurethane foams are particularly preferably obtained by reaction of a mixture of highly reactive polyols which usually have a mean molecular weight of from about 4800 to 6500 g/mol and have at least 70% of primary hydroxyl groups and, in addition to the cold-cure flexible foam stabilizer formulation, catalysts such as amine activators and blowing agents, may further comprise fillers and/or polyfunctionalized isocyanates.

The water-insoluble polysiloxane compounds which can be used according to the invention can be employed in amounts of from 0.005 to 5.0 parts and preferably from 0.01 to 2 parts of water-insoluble polysiloxane compounds per one hundred parts of polyol.

Highly reactive polyols are obtained, for example, by polyaddition of propylene oxide or ethylene oxide onto relatively high-functionality compounds such as glycerol, penta-erythritol or trimethylolpropane.

A further class of highly reactive polyols is filled polyols (polymer polyols). These contain dispersed solid organic fillers up to a solids content of 40% or more. Use is made of, inter alia:

SAN polyols: These are highly reactive polyols containing a dispersed copolymer based on styrene-acrylonitrile (SAN).

PHD-polyols: These are highly reactive polyols containing polyurea, likewise in dispersed form.

PIPA polyols: These are highly reactive polyols which contain a dispersed polyurethane, for example, formed by in-situ reaction of an isocyanate with an alkanolamine in a conventional polyol.

The solids content, which is preferably in the range from 5 to 40% by weight based on the polyol, depending on the application, is responsible for improved cell opening, so that the polyol can be foamed in a controlled fashion, in particular with TDI, and no shrinkage of the foams occurs. The solid thus acts as an important processing aid. A further function is to control the hardness via the solids content, since higher solids contents result in a higher hardness of the foam.

The formulations comprising solids-containing polyols have a significantly lower intrinsic stability and therefore tend to require physical stabilization in addition to the chemical stabilization due to the crosslinking reaction.

Depending on the solids content of the polyols, these are used either alone or in admixture with the abovementioned unfilled polyols.

As isocyanates, it is possible to use organic isocyanate compounds which contain at least two isocyanate groups. In general, the aliphatic, cycloaliphatic, araliphatic and preferably aromatic polyfunctional isocyanates can be employed. Particular preference is given to using isocyanates in an amount of from 60 to 140 mol % relative to the sum of the isocyanate-consuming components.

Both TDI (toluene 2,4- and 2,6-diisocyanate isomer mixture) and MDI (diphenylmethane 4,4'-diisocyanate) are used. The "crude MDI" or "polymeric MDI" comprise not only the 4,4' isomer but also the 2,4' and 2,2' isomers together with products having more than two rings. The term "pure MDI" is used to refer to two-ring products comprising predominantly 2,4' and 4,4' isomer mixtures and their prepolymers. Further suitable isocyanates are listed in the patent document EP-B-1 095 968, which is hereby fully incorporated by reference.

Slabstock foams and molded foams are frequently produced using different isocyanates. Thus, in cold-cure slabstock foam systems, pure TDI (various 2,4 and 2,6 isomer mixtures) is generally used as polyfunctional isocyanates in combination with solids-containing polyols. Furthermore, modified TDI types can also be used in combination with highly reactive unfilled polyols.

As amine activators or catalysts, it is possible to employ all substances known to those skilled in the art. Preference is given to using tertiary amines such as triethylenediamine (TEDA) which has a predominantly crosslinking action, i.e., catalyzes the reaction between isocyanate and polyol, or bis (2-dimethylaminoethyl)ether (BDE) which has a predominantly blowing action, i.e., catalyzes the reaction between isocyanate and water. Many formulations are based on catalysis by a combination of these two compounds. However, other amines are also possible (further suitable amines are mentioned in the patent document EP-B-1 095 968). The amount used is usually in the range from 0.05 to 0.5 part per 100.0 parts of polyol. All metal-containing catalysts known to those skilled in the art can likewise be used. These are, for example, organometallic compounds or metal salts of the following metals: tin, zinc, tungsten, iron, bismuth, titanium. In a preferred embodiment, the catalysts from the group consisting of zinc carboxylates and tin carboxylates are used.

For the purposes of the present invention, crosslinkers are low molecular weight polyfunctional compounds which are reactive toward isocyanates. Suitable crosslinkers are hydroxyl- or amine-terminated substances such as glycerol, polyglycerol, pentaerytritol, dipentaerytritol, sorbitol, trishydroxymethylaminomethane, triethanolamine (TEOA), diethanolamine (DEOA) and trimethylolpropane. The concentration used in the present invention is usually in the range from 0.5 to 2.0 parts per 100.0 parts of polyol, depending on the formulation, but can also deviate therefrom. When crude MDI is used in foaming in a mold, this likewise assumes a crosslinking function. The content of low molecular weight crosslinkers can therefore be correspondingly reduced as the amount of crude MDI is increased.

The formulations of the invention can be used both in slabstock foam production and in foaming in a mold. All methods known to those skilled in the art for producing PU foams can be used. Thus, for example, the foaming process can occur either in a horizontal direction or in a vertical direction. The aqueous stabilizer formulations of the invention can likewise be utilized for the $CO_2$ technology. Use in low-pressure and high-pressure machines is possible, in which case the formulations of the invention can either be metered directly into the mixing chamber or can be mixed upstream of the mixing chamber into one of the components which subsequently goes into the mixing chamber. Mixing can also be carried out in a raw materials tank.

The present invention further provides a product comprising a highly elastic cold-cure flexible polyurethane foam which has been produced using the aqueous cold-cure flexible foam stabilizer formulation and/or the cold-cure flexible foam activator blend.

The subject matter of the present invention is illustrated by means of the following examples.

EXAMPLES

Production of aqueous cold-cure flexible foam stabilizer formulations according to the invention

Example 1

Aqueous Cold-Cure Flexible Foam Stabilizer Formulation:
70 g of a polydimethylsiloxane as described in DE-A-25 33 074 Example 4 as mixture 1 were processed with 5 g of a castor oil ethoxylate containing 160 mol of ethylene oxide, 5 g of an isotridecyl alcohol ethoxylate containing 12 mol of ethylene oxide and 120 g of water by the method described in DE-A-30 24 870 in Example 3 to form an emulsion.

Example 2

Aqueous Cold-Cure Flexible Foam Stabilizer Formulation:
70 g of the polydimethylsiloxane as in Example 1 were processed with 2 g of Synperonic® PE L 92 (ethylene oxide-propylene oxide block polymer), 8 g of Synperonic® PE F 108 (ethylene oxide-propylene oxide block polymer), both obtainable from Uniqema, and 120 g of water using a method analogous to Example 1 to form a stable emulsion.

Example 3

Aqueous Cold-Cure Flexible Foam Stabilizer Formulation:
70 g of the polydimethylsiloxane as in Example 1 were processed with 6 g of PE 4322-RM, obtainable from Goldschmidt GmbH, 4 g of the polyalkylene oxide described in DE-A-1 994 07 97 under the designation A5, and 120 g of water containing 0.24 g of Tego® Carbomer 141 (obtainable from Goldschmidt) using a method analogous to Example 1 to form a stable emulsion and 0.4 g of Acticide® MBS, obtainable from Thor, was subsequently added.

Example 4

Aqueous Cold-Cure Flexible Foam Stabilizer Formulation:
200 g of a polydimethylsiloxane as described in Example 1 was processed with 10 g of a castor oil ethoxylate containing 160 mol of ethylene oxide, 10 g of an isotridecyl alcohol ethoxylate containing 12 mol of ethylene oxide and 180 g of water containing 0.36 g of Tego® Carbomer 141 (obtainable from Goldschmidt) using a method analogous to Example 1 to form a stable emulsion and 0.8 g of Acticide® MBS, obtainable from Thor, was subsequently added.

Example 5

Aqueous Cold-Cure Flexible Foam Stabilizer Formulation:
200 g of a polydimethylsiloxane as described in Example 1 were processed with 10 g of a castor oil ethoxylate containing 160 mol of ethylene oxide, 10 g of an isotridecyl alcohol ethoxylate containing 12 mol of ethylene oxide, 40 g of dipropylene glycol and 140 g of water containing 0.28 g of Tego® Carbomer 141 (obtainable from Goldschmidt) using a method analogous to Example 1 to form a stable emulsion and 0.8 g of Acticide® MBS, obtainable from Thor, was subsequently added.

Example 6

Aqueous Cold-Cure Flexible Foam Stabilizer Formulation:
490 g of water containing 0.98 g of Tego® Carbomer 141 (obtainable from Goldschmidt) were slowly added to 10 g of the emulsion from Example 3 while stiffing so as to give a stable emulsion.

Example 7

Aqueous Cold-Cure Flexible Foam Stabilizer Formulation:
10 g of water containing 0.88 g of Tego® Carbomer 141 (obtainable from Goldschmidt) and 50 g of dipropylene glycol were slowly added to 10 g of the emulsion from Example 4 while stirring so as to give a stable emulsion.

Example 8

Aqueous Cold-Cure Flexible Foam Stabilizer Formulation:
70 g of the chloropropylsiloxane which is described in DE-C-36 26 297 in the examples as polysiloxane III were processed with 5 g of a castor oil ethoxylate containing 160 mol of ethylene oxide, 5 g of an isotridecyl alcohol ethoxylate containing 12 mol of ethylene oxide and 120 g of water as described in Example 1 to form an emulsion and 0.4 g of Acticide® MBS (obtainable from Thor) was subsequently added.

Example 9

Production of a Cold-Cure Flexible Foam Activator Blend:
30 g of the aqueous cold-cure flexible foam stabilizer formulation from Example 2 were stirred with 382 g of water and an amine mixture consisting of 150 g of diethanolamine, 50 g of TEGOAMIN® 33 (33% solution of triethylenediamine in dipropylene glycol) and 7 g of TEGOAMIN® BDE (70% solution of bis(dimethylaminoethyl)ether in dipropylene glycol), both obtainable from Goldschmidt A turbid emulsion was obtained. This was stored in a separating funnel for 10 days. No inhomogeneities or phase separations were observed.

Comparative Example 1

30 g of polydimethylsiloxane as in Example 1 were mixed with 270 g of dioctyl phthalate, giving a homogeneous solution. 30 g of this formulation were stirred with 382 g of water and the amine mixture described in Example 9. This resulted in formation of two phases. It was not possible to produce a homogeneous activator blend.

Production of Cold-Cure Flexible Polyurethane Foams:
Formulation A: 100 parts of polyol having an OH number of 35 mg KOH/g and a molar mass of 5000 g/mol, 2.25 parts of water, 0.5 part of diethanolamine, 0.4 part of TEGOAMIN® 33, 0.1 part of TEGOAMIN® BDE, 0.15 part of KOSMOS 29 and 3 parts of Ortegol 204 from Goldschmidt as crosslinker and 40 parts of isocyanate (T80=tolylene 2,4- and 2,6-diisocyanate isomer mixture in a ratio of 80:20).

Formulation B: 60 parts of polyol having an OH number of 35 mg KOH/g and a molar mass of 5000 g/mol, 40 parts of the PHD polyol having a solids content of 20% and an OH number of 29 mg KOH/g and a molar mass of 6000 g/mol, 4 parts of water, 1.5 parts of diethanolamine, 0.5 part of TEGOAMIN® 33 and 0.07 part of TEGOAMIN® BDE and 48 parts of isocyanate (T80).

Production of Slabstock Foam Using Formulation A:
The foams were produced in a known manner by mixing all components apart from the isocyanate in a cup, subsequently adding the isocyanate and stirring it in quickly at a high stirrer speed. The reaction mixture was then poured into a container which was lined with paper and had a base area of 28×28 cm. The rise height and the settling were determined. The blowing-off of the foam was evaluated on a scale from 0 to 3, with 0 denoting poor or undiscernible blowing off and 3 denoting very strong blowing-off. Values of 1 to 2 were sought.

Settling is the decrease in the rise height in cm 1 minute after the maximum rise height has been reached.

The term "blowing-off" refers to escape of the blowing gases from the opened cells of the foam.

Example 10

The aqueous cold-cure flexible foam stabilizer formulation from Example 1 was used as stabilizer, with the amount of water present therein, viz. 60% by weight, being taken into account in the foam formulation. The aqueous cold-cure flexible foam stabilizer formulation was used in an amount corresponding to 0.1 part of water-insoluble polysiloxane of Example 1 per 100 parts of polyol.

The foam obtained had good stability. At a rise height of 22 cm, the settling was 0.5 cm. The blowing-off behavior was evaluated as 1 to 2. The cell count was 12 cells/cm.

Example 11

The cold-cure flexible foam stabilizer formulation from Example 2 was used as stabilizer, with the amount of water present therein being taken into account in the foam formulation. 0.1 part of siloxane per 100 parts of polyol were incorporated. The foam had good stability. At a rise height of 22.8 cm, the settling was 0.4 cm. The blowing-off behavior was evaluated as 1 to 2. The cell count was 12 cells/cm.

Example 12

The cold-cure flexible foam stabilizer formulation from Example 3 was used as stabilizer, with the amount of water present therein being taken into account in the foam formulation. 0.1 part of siloxane per 100 parts of polyol were incorporated. The foam had good stability. At a rise height of 22.6 cm, the settling was 0.5 cm. The blowing-off behavior was evaluated as 1 to 2. The cell count was 12 cells/cm.

Molded Foam Examples, Formulation B:

The foams were produced in a known manner by mixing all components apart from the isocyanate in a cup, subsequently adding the isocyanate and stirring it in quickly at a high stirrer speed. The reaction mixture was then poured into a cuboidal mold which had been heated to a temperature of 60° C. and the composition was allowed to cure for 6 minutes. The forces for opening the cells were subsequently measured. Here, the foams were compressed 10 times to 50% of their height. Pressure was then applied (manually) to open the cells completely and subsequently be able to determine the hardness of the opened foam on the eleventh measurement. The foams were then cut open to assess skin and surface zone and to determine the cell count.

Example 13

The activator blend from Example 9 was used here, with the required amount of activator blend being taken from the upper part of the separating funnel after storage for one week.

In accordance with formulation B, 6.12 parts of the activator blend were used per 100 parts of the polyol mixture and 48 parts of isocyanate for producing a foam.

The forces for opening the cells were as follows: 1st measurement: 1279 N, 10th measurement: 165 N, 11th measurement: 129 N. Skin and surface zone displayed no defects. The cell count was 9 cells/cm.

Example 14

The activator blend from Example 9 was used here, with the required amount of activator blend being taken from the lower part of the separating funnel after storage for one week.

In accordance with formulation B, 6.12 parts of the activator blend were used per 100 parts of the polyol mixture and 48 parts of isocyanate for producing a foam.

The forces for opening the cells were as follows: 1st measurement: 1333 N, 10th measurement: 160 N, 11th measurement: 131 N. Skin and surface zone displayed no defects. The cell count was 9 cells/cm.

It can be seen from these two examples that the activator blend based on the formulation according to the invention was stable at 23° C. for a period of at least 10 days.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:

1. A cold-cure flexible polyurethane foam obtained from reacting polyols with isocyanates using a foam activator blend, wherein said foam activator blend comprises:
   from ≥2 to ≤25% by weight, of an aqueous stabilizer formulation,
   from ≥1 to ≤20% by weight of a catalyst,
   from ≥1 to ≤90% by weight of a blowing agent,
   from ≥1 to ≤5 90% by weight, of at least one of a flame retardant, UV stabilizer, a dye, another biocide, a pigment, a cell opener, a crosslinker and a foam-stabilizing substance, with the proportion by weight of the above-mentioned components being selected so that the sum of the proportions by weight of the components is 100% by weight, based on the foam activator blend, and wherein said aqueous stabilizer formulation consists essentially of:
   a) from ≥0.1 to ≤80% by weight of at least one water-insoluble polysiloxane compound having a molecular weight of from ≥300 g/mol to ≤10 000 g/mol, wherein said at least one water-insoluble polysiloxane compound is of general formula (I):

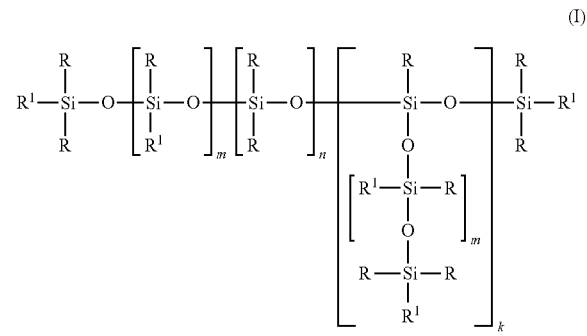

where the radicals
R of formula (I) are each methyl,
the radicals
R¹ of formula (I) are each equal to R,
n of formula (I) is from ≥0 to 50,
m of formula (I) is from ≥0 to 50, k is from ≥0 to 10, with the proviso that n+m of formula (I) ≥2 and n+m of formula (I) ≤70, or of general formula III:

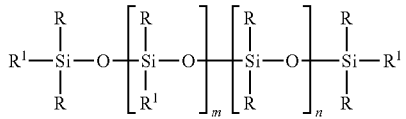

(III)

where the radicals
R of formula (III) are methyl,
the radicals
R¹ of formula (III) are each R,
n of formula (III) is from ≥2 to 30,
m of formula (III) is from ≥0 to ≤5,
b) 2% by weight of water,
c) 0.1% by weight of surfactant, wherein said surfactant is other than a water-insoluble polysiloxane compound or a water-soluble siloxane,
d) from ≥0 to 10% by weight of additives selected from the group consisting of thickeners, antifreezes, organic solvents and biocides, and
e) ≥0% by weight of water-soluble siloxane(s), with the proportion by weight of components a)-e) selected so that the sum of the proportions by weight of the components is not more than 100% by weight, based on the aqueous stabilizer formulation.

2. The cold-cure flexible polyurethane foam as claimed in claim 1, wherein said at least one water-insoluble polysiloxane compound has a molecular weight of ≥10 000 g/mol and is of said general formula I.

3. The cold-cure flexible polyurethane foam as claimed in claim 1,
wherein, in formula (I),
n is from 1 to 50,
m is from ≥1 to 20, and
k is from ≥1 to 10.

4. The cold-cure flexible polyurethane foam as claimed in claim 1, wherein said water is present in an amount from 2 to 99%, said surfactant is present in an amount from 0.1 to 90% by weight, said additive is present in an amount from ≥0 to 10% by weight, and said water-soluble siloxane(s) is present in an amount from ≥0 to 80% by weight.

5. The cold-cure flexible polyurethane foam as claimed in claim 1, wherein the water-insoluble polysiloxane compound has said formula III.

6. The cold-cure flexible polyurethane foam as claimed in claim 1, wherein a ratio (Q) of a proportion by mass of the surfactants used to the proportion by mass of the water-insoluble siloxanes in the aqueous stabilizer formulation is in the range 0<Q≤1.

7. The cold-cure flexible polyurethane foam as claimed in claim 1, wherein the water-insoluble polysiloxanes have a molecular weight of from 300 to 4000 g/mol.

8. The cold-cure flexible polyurethane foam as claimed in claim 1, wherein the water-insoluble polysiloxane compound has a maximum of 70 Si atoms.

9. The cold-cure flexible polyurethane foam as claimed in claim 1, wherein the water-insoluble polysiloxane has m=0 with a viscosity of from ≥0 to ≤100 mPas.

10. The cold-cure flexible polyurethane foam as claimed in claim 1, wherein the surfactant is a water-soluble surfactant selected from the group consisting of anionic surfactants, cationic surfactants, nonionic surfactants and amphoteric surfactants.

11. The cold-cure flexible polyurethane foam as claimed in claim 1, wherein said cold-cure flexible polyurethane foam is an elastic cold-cure flexible polyurethane foam.

12. A method of forming a cold-cure flexible polyurethane foam, the method comprising:
reacting polyols with isocyanates in the presence of an activator blend, said activator blend comprising:
from ≥2 to ≤5 25% by weight, of an aqueous stabilizer formulation,
from ≥1 to ≤20% by weight of a catalyst,
from ≥1 to ≤90% by weight of a blowing agent,
from ≥1 to ≤90% by weight, of at least one of a flame retardant, UV stabilizer, a dye, another biocide, a pigment, a cell opener, a crosslinker and a foam-stabilizing substance, with the proportion by weight of the above-mentioned components being selected so that the sum of the proportions by weight of the components is 100% by weight, based on the foam activator blend, and wherein said aqueous stabilizer formulation consists essentially of:
a) from ≥0.1 to ≤80% by weight of at least one water-insoluble polysiloxane compound having a molecular weight of from ≥300 g/mol to ≤10 000 g/mol, wherein said at least one water-insoluble polysiloxane compound is of general formula (I):

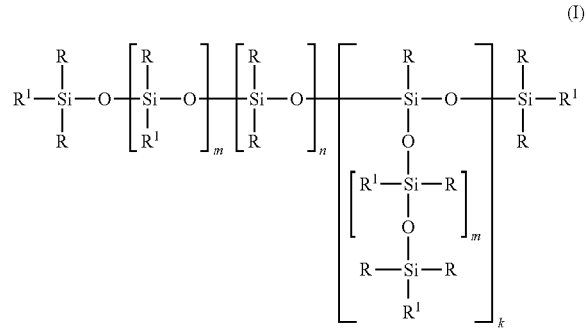

(I)

where the radicals
R of formula (I) are each methyl,
the radicals
R¹ of formula (I) are each equal to R,
n of formula (I) is from ≥0 to 50,
m of formula (I) is from ≥0 to 50,
k is from ≥0 to 10, with the proviso that n+m of formula (I) ≥2 and n+m of formula (I) ≤70, or of general formula III:

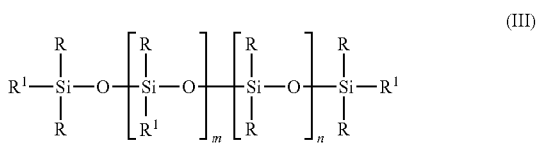

(III)

where the radicals
R of formula (III) are methyl,
the radicals
R$^1$ of formula (III) are each R,
n of formula (III) is from ≥2 to 30,
m of formula (Et) is from ≥0 to ≤5,
b) ≥2% by weight of water,
c) ≥0.1% by weight of surfactant, wherein said surfactant is other than a water-insoluble polysiloxane compound or a water-soluble siloxane,
d) from ≥0 to 10% by weight of additives selected from the group consisting of thickeners, antifreezes, organic solvents and biocides, and
e) ≥0% by weight of water-soluble siloxane(s),
with the proportion by weight of components a)-e) are selected so that the sum of the proportions by weight of the components is not more than 100% by weight, based on the aqueous cold stabilizer formulation.

* * * * *